(12) United States Patent
Zhao et al.

(10) Patent No.: US 9,266,766 B2
(45) Date of Patent: Feb. 23, 2016

(54) VACUUM GLASS SEALING METHOD AND DEVICE

(75) Inventors: Yan Zhao, Henan (CN); Yanbing Li, Henan (CN); Zhangsheng Wang, Henan (CN); Jianbo Shi, Henan (CN); Shitao Pang, Henan (CN)

(73) Assignee: LUOYANG LANDGLASS TECHNOLOGY CO., LTD, Henan (CN)

( * ) Notice: Subject to any disclaimer, the term of this patent is extended or adjusted under 35 U.S.C. 154(b) by 195 days.

(21) Appl. No.: 14/124,885

(22) PCT Filed: Aug. 9, 2011

(86) PCT No.: PCT/CN2011/078161
§ 371 (c)(1),
(2), (4) Date: Jan. 3, 2014

(87) PCT Pub. No.: WO2013/004038
PCT Pub. Date: Jan. 10, 2013

(65) Prior Publication Data
US 2014/0116092 A1 May 1, 2014

(30) Foreign Application Priority Data
Jul. 5, 2011 (CN) .......................... 2011 1 0186356

(51) Int. Cl.
| C03B 23/24 | (2006.01) |
| C03C 27/08 | (2006.01) |
| E06B 3/66 | (2006.01) |
| E06B 3/677 | (2006.01) |

(52) U.S. Cl.
CPC .............. *C03B 23/245* (2013.01); *C03C 27/08* (2013.01); *E06B 3/6612* (2013.01); *E06B 3/6775* (2013.01); *Y02B 80/24* (2013.01)

(58) Field of Classification Search
CPC ....... C03B 23/24; C03B 23/245; Y02B 80/24
See application file for complete search history.

(56) References Cited

U.S. PATENT DOCUMENTS

2009/0151853 A1   6/2009   Cooper

FOREIGN PATENT DOCUMENTS

| CN | 1286670 A | 3/2001 |
| CN | 101050056 A | 10/2007 |
| CN | 101148313 A | 3/2008 |
| JP | 59057221 A * | 4/1984 |
| WO | 03095388 A1 | 11/2003 |

OTHER PUBLICATIONS

English Translation of JP59057221A Performed by Phoenix Translations, Sep. 2015.*

* cited by examiner

*Primary Examiner* — Lisa Herring
(74) *Attorney, Agent, or Firm* — AKC Patents, LLC; Aliki K. Collins

(57) ABSTRACT

The present invention discloses a vacuum glass sealing method and a sealing device using the method. The sealing device comprises a bottom plate, an annular side wall, a cover plate, a partition plate and a heating device, wherein the lower end of the annular side wall is situated on the bottom plate and air-tightly connected with the bottom plate; the cover plate is air-tightly covered at the upper end of the annular side wall; the partition plate is arranged on the middle part of the height direction of the annular side wall; after the periphery of the partition plate is air-tightly connected with the inner surface of the annular side wall, the partition plate divides the space encircled by the bottom plate, the annular side wall and the cover plate into a first closed space and a second closed space; and the two closed spaces are provided with an air extraction port for vacuumizing respectively.

14 Claims, 4 Drawing Sheets

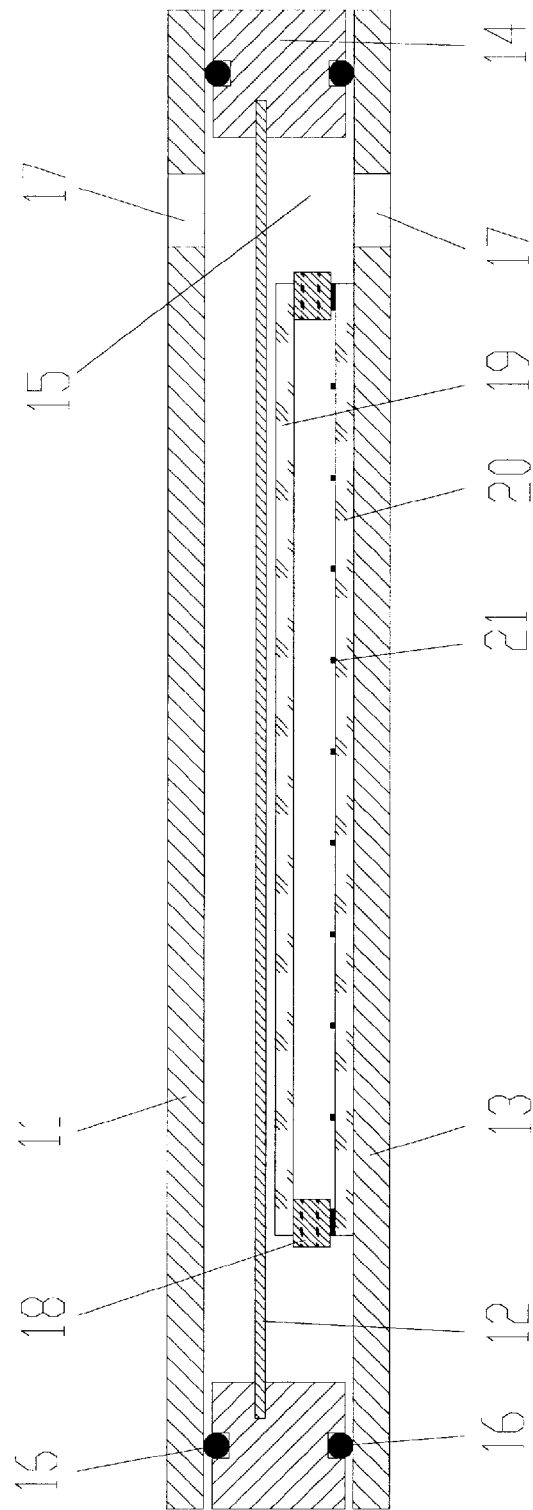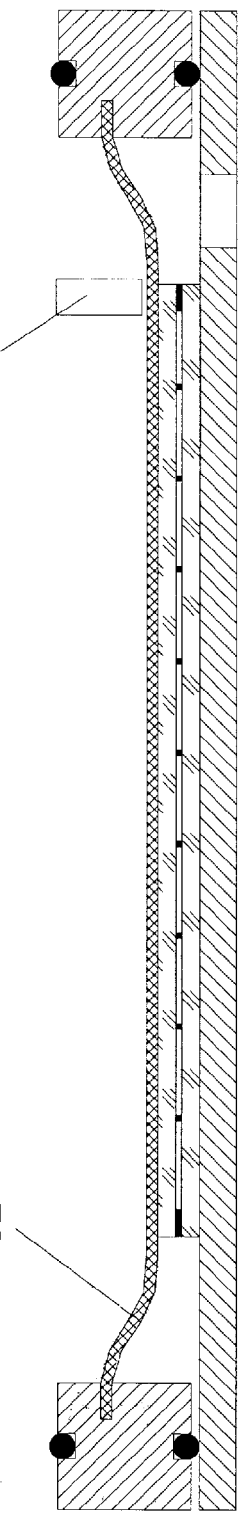
FIG. 2
FIG. 3

VACUUM GLASS SEALING METHOD AND DEVICE

TECHNICAL FIELD

The present invention relates to a vacuum glass sealing method and a vacuum glass sealing device.

BACKGROUND ARTS

Previously, the applicant submitted an invention patent application named as "Vacuum Glass Sealing Device" to China Patent Bureau, and the application number is 201010555370.3. The structure of the vacuum glass sealing device is shown in a FIG. 1. The vacuum glass sealing device comprises an air extraction table 1, an upper pressure plate 2 and a heating device 4; the air extraction table 1 is provided with an accommodating groove 7 for placing a glass plate to be sealed and an air extraction port 6 communicated with the accommodating groove 7; in order to reliably connect the upper pressure plate 2 and the air extraction table 1, the upper pressure plate 2 is also provided with an annular pressure plate 3; and the pressure plate 3 is fixed with the air extraction table 1 through a plurality of clamping flanges 5. During working, the upper pressure plate 2 is directly covered and pressed on the glass plate 8 to be sealed in the accommodating groove 7, the glass plate 8 to be sealed is sealed in a closed space by air-tightly connecting with the air extraction table 1 around the periphery of the accommodating groove 7, then the closed space is vacuumized through the air extraction port 6, the part to be sealed on the glass plate to be sealed is heated by using the heating device 4 from the exterior of the closed space after the required vacuum degree is achieved, and air-tight sealing of the sealed part is completed by a metal welding process.

When the above sealing device is used for processing vacuum glass, a plurality of glass plates forming the vacuum glass are mutually assembled together according to the vacuum glass structure before sealing, the clearance formed at the vacuum space in the vacuum glass is only about 0.2 mm, and the small slit has low conductance and seriously blocks the escape of air molecules when vacuumizing, so the sealing device still has the defects that the vacuumizing time is long and it is difficult to achieve high vacuum degree.

INVENTION CONTENTS

With respect to the defects of the vacuum glass sealing device, the primary purpose of the present invention is to provide a vacuum glass sealing method, and meanwhile, the present invention further provides a vacuum glass sealing device.

In order to fulfill the purpose, the vacuum glass sealing method of the present invention comprises the following steps of:

(1) Conveying the glass plates to be sealed into a vacuum chamber, and making the vacuum degree around each glass plate totally as same as that in the vacuum chamber;

(2) After the vacuum chamber is extracted to the required vacuum degree, assembling a plurality of glass plates into a to-be-sealed state according to the vacuum glass structure;

(3) Maintaining the vacuum degree in the vacuum chamber unchangeable, applying pressure to the surface of the assembled glass plates to be sealed, and completing air-tight sealing on the periphery of the glass plates to be sealed in the state.

Further, in the step (3), the pressure applied to the surface of the assembled glass plates to be sealed is equal to or as close as possible to atmospheric pressure.

The present invention adopts the technical solution of the other vacuum glass sealing method for fulfilling the purposes:

(1) Taking a partition plate as a common side wall, and forming a closed space on two sides of the partition plate respectively;

(2) Assembling a plurality of glass plates according to a corresponding relationship when the vacuum glass is formed, arranging a middle support for forming the vacuum space on at least one of every two adjacent glass plates, and inserting a partition device during assembly so that a big enough interval is formed between the every two adjacent glass plates to ensure conductance between the two adjacent glass plates high enough and enable the air molecules to successfully escape during vacuumizing;

(3) Putting the assembled glass plates into one of the closed spaces, and simultaneously vacuumizing the two closed spaces in a state that the partition plate and the glass plate are kept in a separate state or the partition plate does not apply any pressure to the glass plate till the closed space of the glass plates achieves the required vacuum degree;

(4) Removing the partition device, and making the every two adjacent glass plates propped on the middle support amid and assembled in a to-be-sealed state;

(5) In the state of keeping the closed space of the glass plates vacuumized, increasing the air pressure of the other closed space so that the partition plate is deformed under the action of pressure difference of two sides and propped on the surface of the glass plates to be sealed, and then applying pressure to the glass plates to be sealed;

(6) Heating the parts to be sealed of the glass plates to be sealed by using a heating device from the exterior of the closed space of the glass plates to be sealed, and completing air-tight sealing on the periphery of the vacuum glass by a metal welding process, wherein the used heating device is an inductive heating device or a microwave heating device.

A vacuum glass sealing device comprises a bottom plate, an annular side wall, a cover plate, a partition plate and a heating device; the lower end of the annular side wall is situated on the bottom plate and air-tightly connected with the bottom plate; the cover plate is air-tightly covered at the upper end of the annular side wall; the partition plate is arranged in the annular side wall between the bottom plate and the cover plate; after the periphery of the partition plate is air-tightly connected with the inner surface of the annular side wall, the partition plate divides the space encircled by the bottom plate, the annular side wall and the cover plate into a first closed space and a second closed space; and the two closed spaces are provided with an air extraction port for vacuumizing respectively, wherein, The first closed space positioned between the partition plate and the bottom plate is used for placing the glass plates to be sealed;

The second closed space positioned between the partition plate and the cover plate is used for controlling the working state of the partition plate: a) synchronously vacuumizing the second closed space and the first closed space so that the partition plate is separated from the glass plates to be sealed in the first closed space or does not apply pressure to the glass plates to be sealed; and b) in the state of keeping the first closed space vacuumized, increasing the air pressure of the second closed space so that the partition plate is propped on the glass plates to be sealed under the action of pressure difference of two sides, further increasing the air pressure of the second closed space, and applying pressure to the glass plates to be sealed;

The heating device is used for heating the parts to be sealed of the glass plates to be sealed from the exterior of the first closed space, and completing air-tight sealing of the parts to be sealed by a metal welding process.

Further, the second closed space is communicated with the atmosphere to increase the air pressure thereof.

Further, the air extraction port of the first closed space is formed on the bottom plate and/or the annular side wall, and the air extraction port of the second closed space is formed on the cover plate and/or the annular side wall.

Further, the bottom plate is air-tightly connected with the lower end of the annular side wall through a sealing ring, the cover plate is air-tightly connected with the upper end of the annular side wall through a sealing ring, and the sealing rings are arranged in sealing ring installation grooves formed on the annular side wall and/or the bottom plate and the cover plate.

Further, the heating device is an inductive heating device or a microwave heating device, and correspondingly, the partition plate positioned between the heating device and the glass plates to be sealed or the bottom plate is made of nonmetallic material.

Further, the periphery of the partition plate is air-tightly fixed on the annular side wall, and in the b) state, the partition plate is propped on the glass plates to be sealed under the action of pressure difference of two sides by means of its deformation.

Further, the partition plate is made of fluorine rubber.

Further, the periphery of the partition plate is air-tightly fixed around the annular side wall through an expansion joint; the expansion joint is an elastomer formed by bending an elastic thin-walled material, the cross section of the expansion joint is of a zigzag shape or a curve shape containing an arc section or a compound shape containing a zigzag structure and a curve section, the expansion joint is deformed by stretching or compressing of the shape of the section therefore, one side of the expansion joint is air-tightly connected with the side of the partition plate, and the other side of the expansion joint is air-tightly fixed on the annular side wall; and in the b) state, the partition plate is propped on the glass plates to be sealed under the action of the pressure difference of the two sides by simultaneous superposition of deformation of the expansion joint for pressing the periphery of the partition plate and personal deformation.

Further, the partition plate is made of PP (polypropylene) plate or PC (polycarbonate) plate.

Further, the heating device is a laser heating device, and the partition plate positioned between the heating device and the glass plates to be sealed or the bottom plate is made of transparent material.

According to the present invention, the partition plate has two working states relative to the glass plates to be sealed by setting two closed spaces, so two external environments are provided for the vacuum glass from vacuumizing to final sealing. Under the condition that the partition plate is separated from the glass plates to be sealed or does not apply any pressure to the glass plates to be sealed, a long distance can be spaced among a plurality of glass plates for forming the vacuum glass, the periphery of each glass plate has the same vacuum degree as the vacuum environment (namely the first closed space), and then the vacuum space in the vacuum glass during sealing has the same vacuum degree as the vacuum environment, so the vacuumizing time is shortened, and the manufactured vacuum glass has a high enough vacuum degree; by increasing the air pressure of one side of the partition plate back to the glass plates to be sealed, the partition plate is propped on the glass plates to be sealed under the action of the pressure difference of the two sides so as to meet the requirement that the parts to be sealed of the glass plates must be welded and sealed in a compression state; particularly, after the pressure of atmosphere is directly acted on the glass plates and the middle support through the parturition plate, the compressive deformation of the glass plates for forming the vacuum glass and the middle support already happens before sealing, and the compressive deformation continuously generated by the action of the atmospheric pressure after the vacuum glass leaves the air extraction table is very small so as to ensure the stability of the vacuum degree of the vacuum glass.

The closed spaces in the sealing device of the present invention are only used for providing vacuum environments, and the heating device for welding is separately arranged on the exterior, so the sealing device is convenient for equipment operation, simplifies equipment construction and creates conditions for large-scale processing of the vacuum glass.

DESCRIPTION OF DRAWINGS

FIG. 2 is a state schematic drawing when glass plates to be sealed are vacuumized in the embodiment 1 of the invention;

FIG. 3 is a state schematic drawing when the glass plates to be sealed are sealed in the embodiment 1 of the invention;

DETAILED DESCRIPTION

Figure 1:
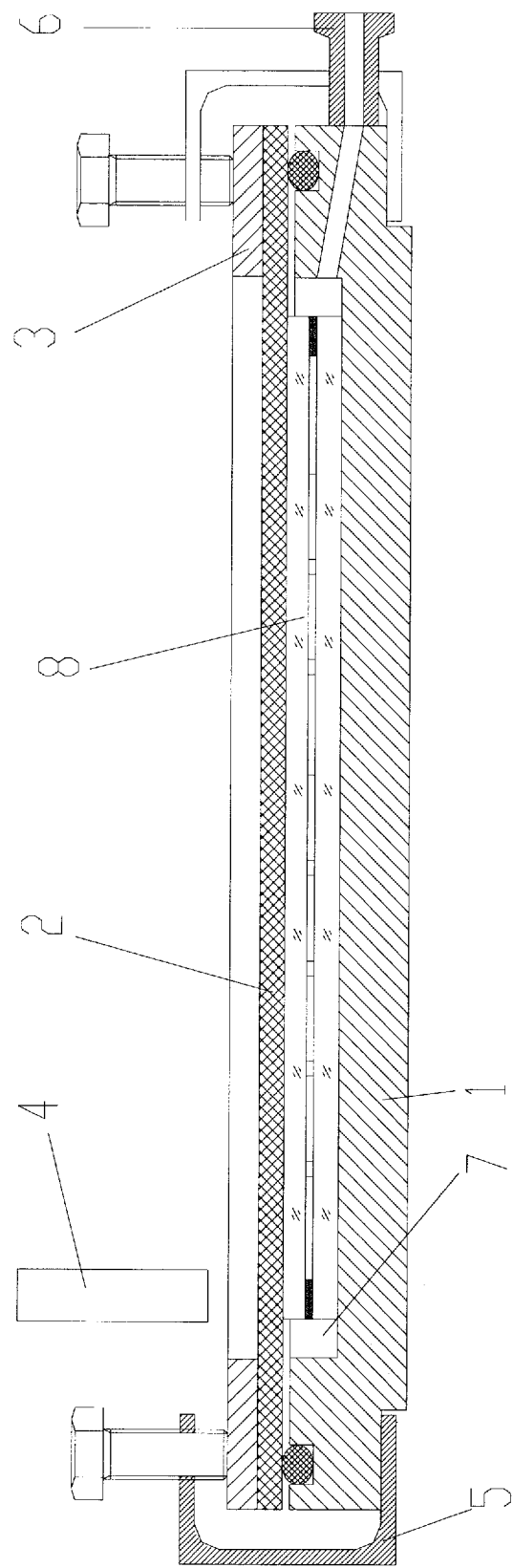
FIG. 1 is a structural schematic drawing of a conventional vacuum glass sealing device.

The present invention is further described in details in connection with the drawings and the following embodiments.

Embodiment 1

The FIG. 2 and the FIG. 3 show the embodiment 1 of the invention. As shown in the figures, the sealing device comprises a bottom plate 13, an annular side wall 14, a cover plate 11, a partition plate 12 and a heating device 22; the lower end of the annular side wall 14 is situated on the bottom plate 13 and air-tightly connected with the bottom plate 13 through a sealing ring 16, and the sealing ring 16 is arranged on an installation groove formed on the annular side wall 14; the cover plate 11 is covered at the upper end of the annular side wall 14, and the periphery of the cover plate 11 is air-tightly connected with the upper end of the annular side wall 14 through a sealing ring 16; the periphery of the partition plate 12 is air-tightly fixed in an annular groove formed on the inner wall of the annular side wall 14 so as to air-tightly divide the space encircled by the cover plate 11, the annular side wall 14 and the bottom plate 13 into a first closed space and a second closed space, wherein the first closed space 15 is encircled by the bottom plate 13, the annular side wall 14 and the partition plate 12, and the second closed space is encircled by the partition plate 12, the annular side wall 14 and the cover plate 11; and the first and second closed spaces are provided with an air extraction port 17 for vacuumizing respectively, the air extraction port 17 of the first closed space 15 is formed on the bottom plate 13, and the air extraction port 17 of the second closed space is formed on the cover plate 11.

The cover plate 11, the bottom plate 13 and the annular side wall 14 are made of metal materials, the partition plate 12 is made of fluorine rubber, and the heating device 22 is an inductive heating device.

Taking the vacuum glass of two layers as an example, when the vacuum sealing device of the present invention works, firstly, assembling an upper glass plate 19 and a lower glass plate 20 according to a corresponding relationship when the vacuum glass is formed, wherein the lower glass plate 20 is provided with a middle support 21 for forming the vacuum space; inserting a partition device 18 between the two glass plates so that the two glass plates have a big enough interval to ensure high enough conductance between the two glass plates and enable air molecules to successfully escape during vacuumizing, wherein the interval is preferably more than or equal to 5 millimeters; secondly, as shown in the FIG. 2, putting the assembled glass plates into the first closed space, and simultaneously vacuumizing the two closed spaces in a state that the partition plate 12 and the upper glass plate 19 are kept in a separate state or the partition plate 12 does not apply any pressure to the glass plate 19 till the first closed space achieves the required vacuum degree; thirdly, dismantling the partition device 18, and making the upper glass plate 19 propped on the middle support 21 and assembled in a to-be-sealed state; fourthly, in the state of keeping the first closed space vacuumized (namely keeping the vacuum degree of the first closed space), stopping vacuumizing the second closed space, connecting the second closed space and the atmosphere, and dismantling the cover plate 11, wherein as shown in the FIG. 3, the partition plate 12 is deformed under the atmospheric pressure and propped on the whole surface of the upper glass plate 19 and the atmospheric pressure is applied on the glass plates to be sealed; and finally, heating the parts to be sealed of the glass plates to be sealed by using the heating device 23 from the exterior of the partition plate 12, and completing air-tight sealing on the periphery of the glass plates to be sealed by a metal welding process.

The heating device 23 can also be a microwave heating device.

When the vacuum glass is processed in a horizontal state by using the sealing device, under the condition that the cover plate 11 weights enough, the air-tight connection between the cover plate and the floor and between the bottom plate and the annular surrounding plate can be ensured without arranging an additional fixing device between the cover plate 11 and the bottom plate 13, otherwise, a fixing device such as a clamping flange for fixing needs to be arranged between the cover plate 11 and the bottom plate 13.

In addition, the heating device 23 in the embodiment 1 can be arranged on a known multi-degree-of-freedom moving mechanism (not shown in the figures), and the multi-degree-of-freedom moving mechanism carries the heating device 23 to move along the parts to be sealed of the glass plates to gradually complete welding of the parts to be sealed so as to ensure the welding quality and lighten the working intensity of operators.

The glass plates to be sealed in the embodiment 1 are directly placed on the bottom plate 13; and when the interval between the upper surface of the upper glass plate 19 and the partition plate is big, the interval can be regulated by arranging a cushion layer or a cushion block with proper thickness on the bottom plate 13 to reduce the deformation of the partition plate 12 as much as possible and improve the working condition of the partition plate 12.

The vacuum glass in the embodiment 1 is a planar vacuum glass; however, when the bottom plate 13 of a curved surface structure, the corresponding annular side wall 14, the partition plate 12 and the cover plate 11 are adopted, the vacuum glass sealing device of the present invention can also process curved surface vacuum glass products.

Embodiment 2

Figure 4:
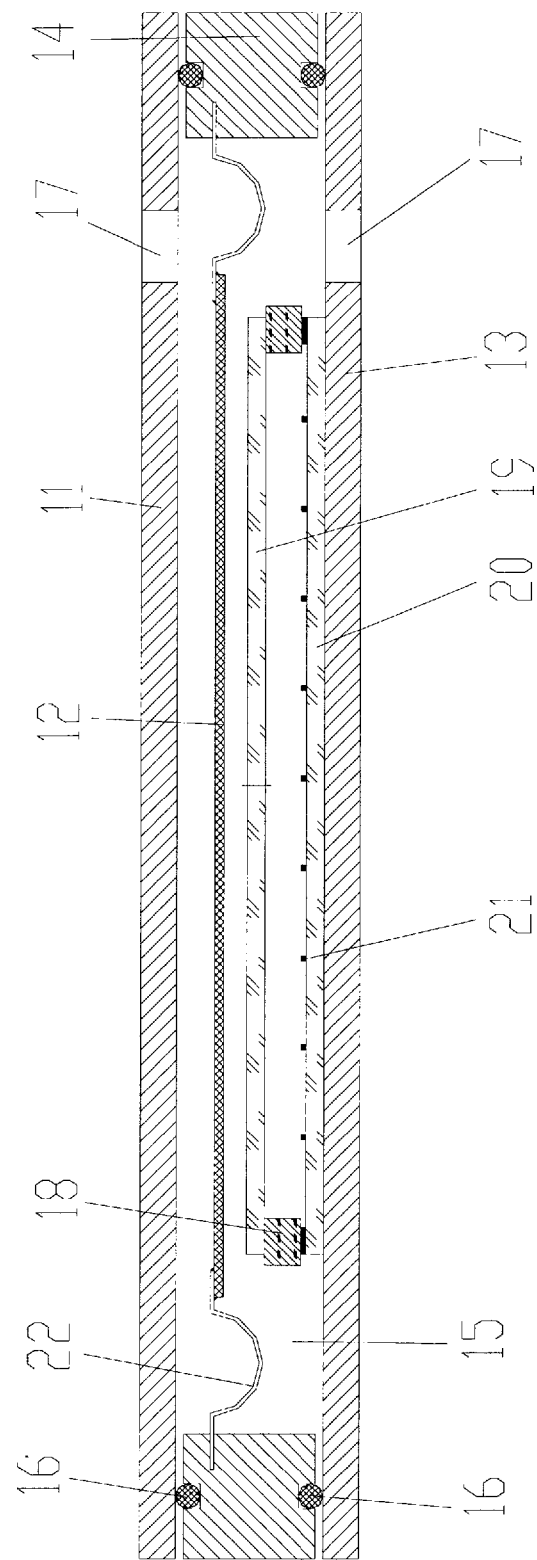
FIG. 4 is a state schematic drawing when glass plates to be sealed are vacuumized in the embodiment 2 of the invention.
Figure 5:
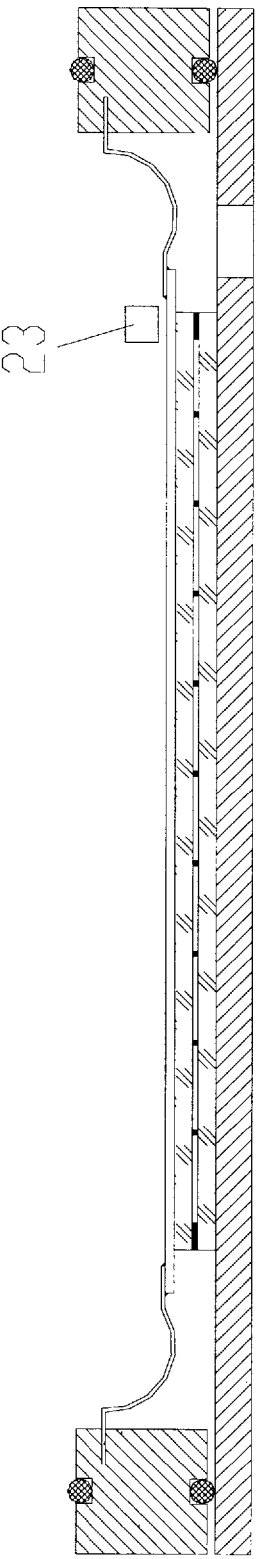
FIG. 5 is a state schematic drawing when the glass plates to be sealed are sealed in the embodiment 2 of the invention.
Figure 6:
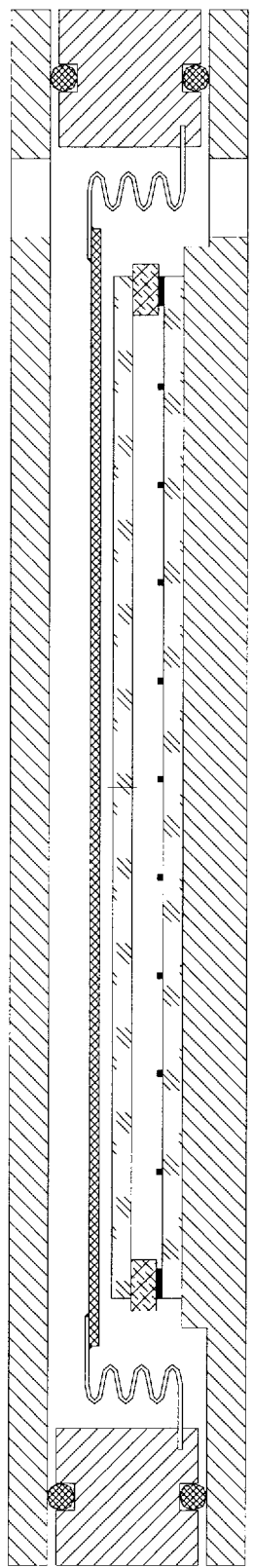
FIG. 6 is a state schematic drawing when glass plates to be sealed are vacuumized in the embodiment 3 of the invention.
Figure 7:
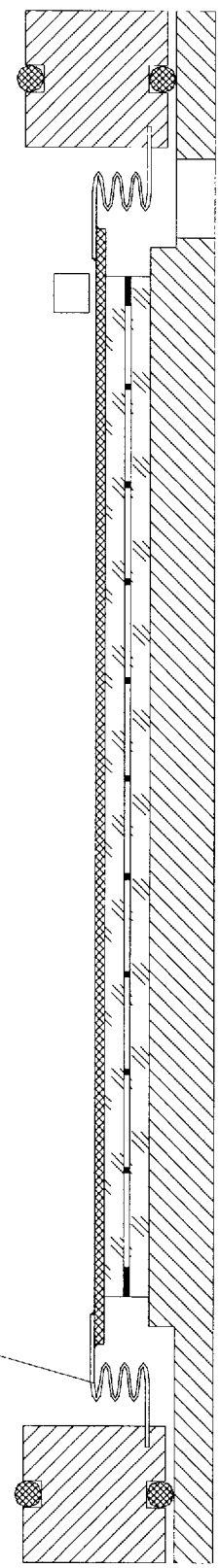
FIG. 7 is a state schematic drawing when the glass plates to be sealed are sealed in the embodiment 3 of the invention.

The FIG. 4 and the FIG. 5 show the embodiment 2 of the invention. Compared with the embodiment 1, in the embodiment 2, the partition plate 12 is arranged in the annular side wall 14 between the bottom plate 13 and the cover plate 11, and the periphery of the partition plate 12 is air-tightly fixed on and around the inner wall of the annular side wall 14 through an expansion joint 22 to air-tightly divide the space encircled by the cover plate 11, the annular side wall 14 and the bottom plate 13 into a first closed space and a second closed space; the first closed space 15 is encircled by the bottom plate 13, the annular side wall 14 and the partition plate 12; the second closed space is encircled by the partition plate 12, the annular side wall 14 and the cover plate 11; and the first and second closed spaces are provided with an air extraction port 17 for vacuumizing respectively, the air extraction port 17 of the first closed space 15 is formed on the bottom plate 13, and the air extraction port 17 of the second closed space is formed on the cover plate 11.

The expansion joint 22 is an elastomer formed by bending an elastic thin-walled steel plate, as shown in the figure, the section of the expansion joint 22 is of a curve shape containing an arc section, one side of the expansion joint 22 is air-tightly connected with the side of the partition plate 12, and the other side of the expansion joint 22 is air-tightly fixed in a slot formed on the annular side wall 14.

The cover plate 11, the bottom plate 13 and the annular side wall 14 are made of metal materials; the partition plate 12 is made of PP (polypropylene) plate, PC (polycarbonate) plate or other nonmetallic material with proper hardness; and the heating device 23 is an inductive heating device.

Taking the vacuum glass of two layers as an example likewise, when the embodiment 2 of the present invention works, as shown in the FIG. 4, firstly, assembling an upper glass plate 19 and a lower glass plate 20, then putting the assembled glass plates into the first closed place 15, simultaneously vacuumizing the first and second closed spaces, and after the first closed place achieves the required vacuum degree, dismantling the partition device 18 so that the upper glass plate is propped on a middle support 21 and assembled in a to-be-sealed state; secondly, in the state of keeping the first closed space vacuumized (namely keeping the vacuum degree of the first closed space), increasing the air pressure of the second closed space till communicating with the atmosphere, and dismantling the cover plate 11, wherein as shown in the FIG. 5, the partition plate 12 is propped on the surface of the upper glass plate 19 under the action of the pressure difference of the two sides by pressing an expansion joint 22 to deform and the atmospheric pressure is applied on the glass plates to be sealed; and finally, heating the parts to be sealed of the glass plates to be sealed by using a heating device 23 from the exterior of the partition plate 12, and completing air-tight sealing on the periphery of the glass plates to be sealed by a metal welding process.

By selecting the expansion joint 22 with as low deformation resistance as possible, the pressure applied on the glass plate 19 to be sealed can be approximately as close to the atmospheric pressure as possible.

The heating device 23 can also be a microwave heating device, and when the bottom plate 13 is made of nonmetal material, the heating device 23 can also heat the glass plates to be sealed from one side of the bottom plate 13.

The heating device 23 can also be a laser heating device, and then the partition plate 12 only needs to be processed by adopting a transparent nonmetal material, for example, the partition plate 12 is manufactured by adopting a transparent PP plate.

In order that the partition plate 12 is propped on the upper glass plate 19 under the action of the pressure difference of the two sides, besides pressing the expansion joint 22 to deform, the partition plate 12 also generates certain deformation at the same time of pressing the expansion joint 22 to deform, and the partition plate is propped on the surface of the upper glass plate 19 under the condition of mutually superposing the deformation of the expansion joint 22 on the deformation of the partition plate 12.

Embodiment 3

The FIG. 4 and the FIG. 5 show another embodiment of the invention. As shown in the figures, an expansion joint 22' of a waveform section structure is adopted in the embodiment 3; and compared with the expansion joint 22 in the embodiment 2, the expansion joint 22' of the waveform section structure can have higher telescopic deformation, so that the partition plate 12 has higher up and down displacement and the total thickness range of the vacuum glass capable of being sealed by the sealing device is wider.

Specifically, the embodiment 2 and the embodiment 3 only list the expansion joints of two specific forms, and in addition, the expansion joint with zigzag section shape and other expansion joints with proper section structures can also be adopted.

The embodiments are only used for explaining the invention. The embodiments of the present invention are not limited in the above embodiments. Various specific embodiments made by the technical personnel of the field and in accordance with the thought of the present invention are within the protection range of the invention.

The invention claimed is:

1. A vacuum glass sealing method, comprising the following steps of:
    (1) Taking a bottom plate, an annular sidewall, a cover plate, and a partition plate as a common side wall, and forming a closed space on two sides of the partition plate respectively;
    (2) Assembling a plurality of glass plates according to a corresponding relationship when the vacuum glass is formed, arranging a middle support for forming a vacuum space on at least one of every two adjacent glass plates, and inserting a movable partition device during assembly so that a big enough interval is formed between the every two adjacent glass plates to ensure high enough conductance between the two adjacent glass plates high enough and enable the air molecules to successfully escape during vacuumizing;
    (3) Putting the assembled glass plates into one of the closed spaces, and simultaneously vacuuming the two closed spaces in a state that the partition plate and the glass plates are kept in a separate state or the partition plate does not apply any pressure to the glass plates till the closed space of the glass plates achieves the required vacuum degree;
    (4) Dismantling the movable partition device, and making the every two adjacent glass plates propped on the middle support amid and assembled in a to-be-sealed state;
    (5) In the state of keeping the closed space of the glass plates vacuumized, increasing the air pressure of the other closed space so that the partition plate is deformed under the action of pressure difference of two sides and propped on the surface of the glass plates to be sealed, and then applying pressure to the glass plates to be sealed;
    (6) Heating the parts to be sealed of the glass plates to be sealed by using a heating device from the exterior of the closed space of the glass plates to be sealed, and completing air-tight sealing on the periphery of the vacuum glass by a metal welding process, wherein the used heating device is an inductive heating device or a microwave heating device.

2. The method according to the claim 1, wherein step (3) further comprises, maintaining the vacuum degree in the vacuum chamber unchangeable, while applying pressure to the surface of the assembled glass plates to be sealed, and completing air-tight sealing on the periphery of the glass plates to be sealed in the state.

3. The method according to the claim 2 characterized in that: in the step (3), the pressure applied to the surface of the assembled glass plates to be sealed is equal to or as close as possible to atmospheric pressure.

4. A vacuum glass sealing device, comprising:
    a bottom plate, an annular side wall, a cover plate, a partition plate and a heating device;
    wherein the lower end of the annular side wall is situated on the bottom plate and air-tightly connected with the bottom plate;
    wherein the cover plate is air-tightly positioned at the upper end of the annular side wall;
    wherein the partition plate is arranged in the annular side wall between the bottom plate and the cover plate so that the periphery of the partition plate is air-tightly connected with the inner surface of the annular side wall, and so that the partition plate divides the space encircled by the bottom plate, the annular side wall and the cover plate into a first closed space and a second closed space;
    wherein the two closed spaces are provided with an air extraction port for vacuumizing respectively;
    wherein the first closed space positioned between the partition plate and the bottom plate is used for placing glass plates to be sealed;
    wherein the second closed space positioned between the partition plate and the cover plate is used for controlling the working state of the partition plate;
    wherein the second closed space and the first closed space are configured to be synchronously evacuated so that the partition plate is separated from the glass plates to be sealed in the first closed space or so that the partition plate does not apply pressure to the glass plates to be sealed; and
    wherein the first closed space is configured to be kept evacuated, while the air pressure of the second closed space is increased so that the partition plate is propped on the glass plates to be sealed under the action of pressure difference of two sides, and wherein the air pressure of the second closed space is configured to be further increased to apply pressure to the glass plates to be sealed;
    wherein a partition device movable between an inserted position in which an interval is formed between two adjacent glass plates for vacuumizing and a dismantled position in which the glass plates are propped on a middle support and assembled in a to-be-scaled state;

wherein the heating device is used for heating the parts to be sealed of the glass plates to be sealed from the exterior of the first closed space; and wherein the parts to be sealed are configured to be air-tight sealed by a metal welding process.

5. The sealing device according to the claim 4 characterized in that: the second closed space is communicated with the atmosphere to increase the air pressure.

6. The sealing device according to the claim 5 characterized in that: the pressure applied to the glass plates to be sealed is equal to or as close as possible to atmospheric pressure.

7. The sealing device according to the claim 4 characterized in that: the air extraction port of the first closed space is formed on the bottom plate and/or the annular side wall, and the air extraction port of the second closed space is formed on the cover plate and/or the annular side wall.

8. The sealing device according to the claim 4 characterized in that: the bottom plate is air-tightly connected with the lower end of the annular side wall through a sealing ring, the cover plate is air-tightly connected with the upper end of the annular side wall through a sealing ring, and the sealing rings are arranged in sealing ring installation grooves formed on the annular side wall and/or the bottom plate and the cover plate.

9. The sealing device according to the claim 4 characterized in that: the heating device is an inductive heating device or a microwave heating device, and correspondingly, the partition plate positioned between the heating device and the glass plates to be sealed or the bottom plate is made of non-metallic material.

10. The sealing device according to the claim 4 characterized in that: the periphery of the partition plate is air-tightly fixed on the annular side wall, and in the b) state, the partition plate is propped on the glass plates to be sealed under the action of pressure difference of two sides by means of personal deformation.

11. The sealing device according to the claim 10 characterized in that: the partition plate is made of fluorine rubber.

12. The sealing device according to the claim 4 characterized in that: the periphery of the partition plate is air-tightly fixed on and around the annular side wall through an expansion joint; the expansion joint is an elastomer formed by bending an elastic thin-walled material, the cross section of the expansion joint is of a zigzag shape or a curve shape containing an arc section or a compound shape containing a zigzag structure and a curve section, the expansion joint is deformed by stretching or compressing of the shape of the section therefore, one side of the expansion joint is air-tightly connected with the side of the partition plate, and the other side of the expansion joint is air-tightly fixed on the annular side wall; and in the b) state, the partition plate is propped on the glass plates to be sealed under the action of the pressure difference of the two sides by simultaneous superposition of deformation of the expansion joint for pressing the periphery of the partition plate and personal deformation.

13. The sealing device according to the claim 12 characterized in that: the partition plate is made of PP (polypropylene) plate or PC (polycarbonate) plate.

14. The sealing device according to the claim 12 characterized in that: the heating device is a laser heating device, and the partition plate positioned between the heating device and the glass plates to be sealed or the bottom plate is made of transparent material.

* * * * *